US 6,675,546 B2

(12) United States Patent
Coles

(10) Patent No.: US 6,675,546 B2
(45) Date of Patent: Jan. 13, 2004

(54) UNIVERSAL CONNECTOR

(75) Inventor: Ian Coles, Thousand Oaks, CA (US)

(73) Assignee: Total Structures, Inc., Ventura, CA (US)

( * ) Notice: Subject to any disclaimer, the term of this patent is extended or adjusted under 35 U.S.C. 154(b) by 209 days.

(21) Appl. No.: 10/033,119

(22) Filed: Oct. 19, 2001

(65) Prior Publication Data
US 2002/0110406 A1 Aug. 15, 2002

Related U.S. Application Data
(60) Provisional application No. 60/241,963, filed on Oct. 20, 2000.

(51) Int. Cl.[7] .............................................. E09H 12/00
(52) U.S. Cl. ........................ 52/655.1; 52/633; 403/157
(58) Field of Search ............................... 52/655.1, 633, 52/645, 646, 638; 403/150, 153, 154, 155, 157, 161, 164

(56) References Cited

U.S. PATENT DOCUMENTS

| 1,393,996 | A | | 10/1921 | Fregonara | |
|---|---|---|---|---|---|
| 1,677,577 | A | | 7/1928 | Amiot | |
| 2,284,898 | A | | 11/1942 | Hartman | |
| 2,744,590 | A | | 5/1956 | Butts | |
| 3,521,421 | A | | 7/1970 | Schroeder, Jr. | |
| 3,727,362 | A | | 4/1973 | Ellison et al. | |
| 3,850,533 | A | * | 11/1974 | Thielen | 403/58 |
| 3,908,477 | A | * | 9/1975 | Teske et al. | 474/224 |
| 4,025,208 | A | * | 5/1977 | Donahue | 403/157 |
| 4,334,816 | A | * | 6/1982 | Slysh | 414/10 |
| 4,337,560 | A | * | 7/1982 | Slysh | 29/897.31 |
| 4,646,552 | A | * | 3/1987 | Kanbe | 72/339 |
| 4,822,197 | A | * | 4/1989 | DeMartino et al. | 403/154 |
| 4,824,350 | A | * | 4/1989 | Sommer et al. | 425/63 |
| 4,836,485 | A | * | 6/1989 | Cooper | 248/278.1 |
| 4,872,361 | A | * | 10/1989 | Muller | 74/473.29 |
| 4,929,113 | A | * | 5/1990 | Sheu | 403/157 |
| 5,205,101 | A | | 4/1993 | Swan et al. | |
| 5,458,647 | A | * | 10/1995 | Brochier et al. | 623/21.17 |
| 5,556,222 | A | * | 9/1996 | Chen | 403/323 |
| 5,587,566 | A | * | 12/1996 | Barten et al. | 187/316 |
| 5,807,007 | A | * | 9/1998 | Stemper | 403/13 |
| D402,040 | S | | 12/1998 | Coles | |
| 5,971,651 | A | * | 10/1999 | Gornick et al. | 403/79 |
| D419,690 | S | | 1/2000 | Fisher | |
| D419,691 | S | | 1/2000 | Fisher | |
| 6,086,481 | A | * | 7/2000 | Li | 472/118 |
| 6,364,566 | B1 | * | 4/2002 | Broberg | 403/155 |

FOREIGN PATENT DOCUMENTS

| DE | 3344555 | 1/1987 |
|---|---|---|
| GB | 1320777 | 6/1937 |

* cited by examiner

Primary Examiner—Jeanette Chapman
(74) Attorney, Agent, or Firm—Marvin E. Jacobs

(57) ABSTRACT

A universal connector that facilitates quick assembly and disassembly of substantially the same and/or different member trusses at substantially the same and/or different angles, one from the other, and which may vary from installation to installation. The universal connector comprises: a male threaded eye end; a female threaded fork end, the female threaded fork end hingedly fastened and mating with the male threaded eye end, one with the other; and opposing threaded barrel sleeves, one of the opposing threaded barrel sleeves fastened to the male threaded eye end, the other opposing barrel sleeve fastened to the female threaded fork end, the threaded barrel sleeves adapted to be fastened thereto truss member ends. The universal connector facilitates quick, easy, and safe assembly and disassembly of the trusses, and is capable of use in a large variety of structures and situations, with the same and/or different types of truss members.

24 Claims, 5 Drawing Sheets

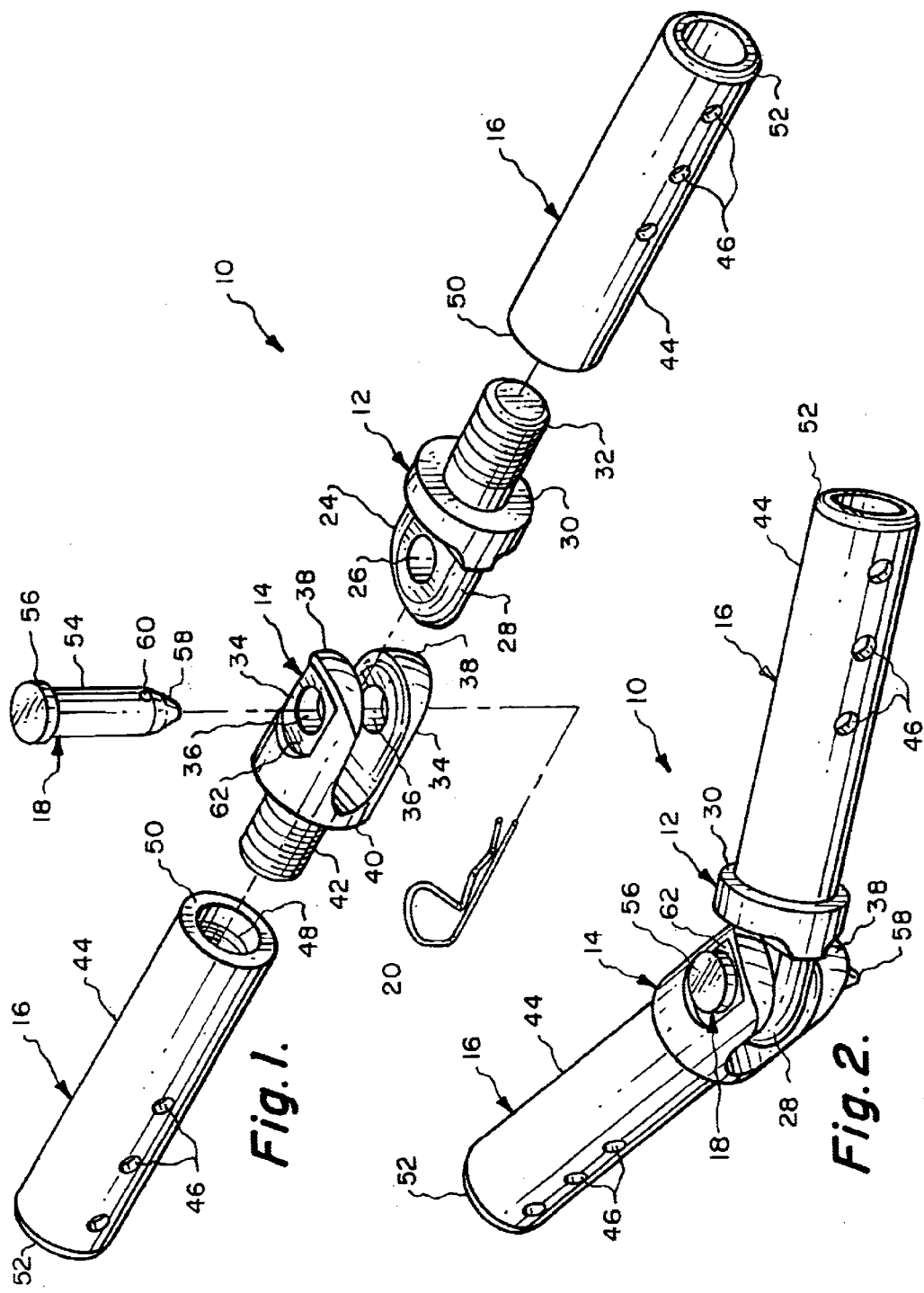

UNIVERSAL CONNECTOR

This application claims the benefit of Provisional Application No. 60/241,963, filed Oct. 20, 2000.

BACKGROUND OF THE INVENTION

1. Field of the Invention

The present invention relates generally to truss connectors and more particularly to truss connectors for temporary structures.

2. Background Art

Temporary structures are used worldwide for entertainment events, trade shows, corporate events, architectural center pieces, film and television production. The same components may be used for construction of different types, shapes, sizes, and styles of structures, for use in situations often requiring quick assembly and disassembly. Trusses are typically used as the main components of such structures.

Trusses comprise a plurality of members fastened one to the other at opposing ends of the members to form a rigid body, and may be used to support a larger load and/or span a greater distance than can be accomplished effectively by a single beam or column. Trusses are frequently used in bridge and roof construction, but with the advent of entertainment events, requiring large, portable, temporary structures, trusses and truss member interconnecting means have become the most important factor in making such events possible.

Rapid and safe assembly and disassembly and use of the trusses is required. A connector that allows quick assembly and disassembly of substantially the same and/or different member trusses at substantially the same and/or different angles, one from the other, and which may vary from installation to installation is needed.

A universal connector is needed, which facilitates quick, easy, and safe assembly and disassembly of the trusses and temporary structures. The universal connector should be capable of use in a large variety of situations, with the same and/or different types of truss members. The universal connector should facilitate the quick assembly and disassembly of substantially the same and/or different member trusses at substantially the same and/or different angles, one from the other, which may vary from installation to installation. The universal connector should also be strong, durable, light weight, easy and safe to use, easy to manufacture, and of simple construction.

The use of outdoor arenas for musical concerts, speeches and religious and political events has created a large demand for such temporary structures to erect stages and to support lighting and speakers therewith. Indoor events at convention centers and other venues also require temporary structures to support lighting, audio, equipment, and product displays and to erect temporary architectural center pieces. Filming on location for television, motion pictures, and commercials also require temporary structures for lighting, audio and video equipment. Temporary structures are also required as shelter framework for as vessel and aircraft construction, other types of construction requiring temporary shelter, scaffolding, building construction and repairs, facades, bridges and other types of constructions. The temporary structures may include stage floors, vertical covered members, and roofs. All of these types of structures take advantage of trusses and truss member connection means.

These temporary structures are erected all over the world, and must conform to safety, construction, and transportation standards required by different countries. The trusses, truss member components, and connectors should preferably be modular and interchangeable, easily, quickly and safely connected one with the other, and assembled and disassembled quickly, easily, and safely. The trusses should be capable of being easily packed for storage and unpacked, and have minimal shipping volume and weight. A universal connector, which facilitates such modular construction and interchangeable truss members for use in a large variety of situations, is needed.

Different truss interconnecting means and trusses have heretofore been known. However, none of the truss interconnecting means or trusses adequately satisfies these aforementioned needs.

German Patent DE 3344555 (Ackermann) discloses a hinged connector for joining frame components of windows, doors, and facades. The hinged connector is locked angularly with a plurality of pins, and affixed to the frame components, using screw fasteners.

U.S. Pat. No. 5,205,101 (Swan et al) discloses a support system for supporting lights, T.V. monitors and similar devices, which includes sectional rail structures comprising identical rails interconnected together in end-to-end relation. Rails are also connected to directional coupling members in angular relation therewith. Quick-connect, overcenter toggle connector devices interconnect the rails together in end-to-end relation and also interconnect rails to coupling members in angular relation.

U.S. Pat. No. 2,744,590 (Butts) discloses load supporting structures having dual connectors, the connectors having spaced annular elements, which receive pins therethrough and lock portions of the structure one to the other.

U.S. Pat. No. 3,727,362 (Ellison et al) discloses a beam structure for supporting roofs, floors or the like generally horizontally extended loads, and has a grid or grill-like arrangement of similar beams, supporting means for the beams, and means for connecting adjacent beams together at adjacent ends thereof to provide the grid arrangement. The beams each include vertically spaced generally parallel top and bottom chords and interconnecting truss work between the chords. Connector elements are provided with aligned central openings for reception of respective nut equipped clamping screws.

U.S. Pat. No. 3,521,421 (Schroeder, Jr.) discloses a geodesic structure comprising a number of interconnected members, each having a hinge pivotal about the respective member axis. Overlapping hinge leaves of adjacent members are pivotally connected about a pivot axis between the adjacent members and orthogonal to the axis of each of the adjacent members.

U.S. Pat. No. 1,393,996 (Fregonara) discloses removable truss component construction, the truss components connected by bolts, and U.S. Pat. No. 2,284,898 (Hartman) discloses a structural system having standardized interchangeable structural units interconnected by bolts or rivets.

U.K. Patent No. 1,088,460 (Butler) discloses prefabricated roof trusses for use in framed buildings, and U.S. Pat. No. D402,040 (Coles) discloses an outdoor stage roof.

U.K. Patent No. 1,320,777 (Basalla) discloses a triangular lattice girder, and U.K. Patent No. 859,752 (Rheinbau) discloses improvements relating to machines for manufacturing lattice girders or trusses. U.S. Pat. No. 1,677,577 (Amiot) discloses frame components, which may be used as spars in aircraft construction, and U.S. Pat. No. D419,690 (Fisher) and U.S. Pat. No. D419,691 (Fisher) show designs of formers for stackable trusses.

For the foregoing reasons, there is a need for a universal connector that facilitates quick assembly and disassembly of substantially the same and/or different member trusses at substantially the same and/or different angles, one from the other, and which may vary from installation to installation The universal connector should facilitate quick, easy, and safe assembly and disassembly of the trusses and temporary structures, and be capable of use in a large variety of situations, with the same and/or different types of truss members. The universal connector should also be strong, durable, light weight, easy and safe to use, easy to manufacture, and of simple construction.

SUMMARY

The present invention is directed to a universal connector that facilitates quick assembly and disassembly of substantially the same and/or different member trusses at substantially the same and/or different angles, one from the other, and which may vary from installation to installation The universal connector facilitates quick, easy, and safe assembly and disassembly of the trusses, and is capable of use in a large variety of structures and situations, with the same and/or different types of truss members. The universal connector is strong, durable, light weight, easy and safe to use, easy to manufacture, and of simple construction.

A universal connector having features of the present invention comprises: a male threaded eye end; a female threaded fork end, the female threaded fork end hingedly fastened and mating with the male threaded eye end, one with the other; and opposing threaded barrel sleeves, one of the opposing threaded barrel sleeves fastened to the male threaded eye end, the other opposing barrel sleeve fastened to the female threaded fork end, the threaded barrel sleeves adapted to be fastened thereto truss member ends.

DRAWINGS

These and other features, aspects, and advantages of the present invention will become better understood with regard to the following description, appended claims, and accompanying drawings where:

FIG. 1 is an exploded view of a universal connector of the present invention;

FIG. 2 is a perspective interior view of the universal connector, constructed in accordance with the present invention;

DESCRIPTION

The preferred embodiments of the present invention will be described with reference to FIGS. 1–7 of the drawings. Identical elements in the various figures are identified with the same reference numbers.

Figure 3:
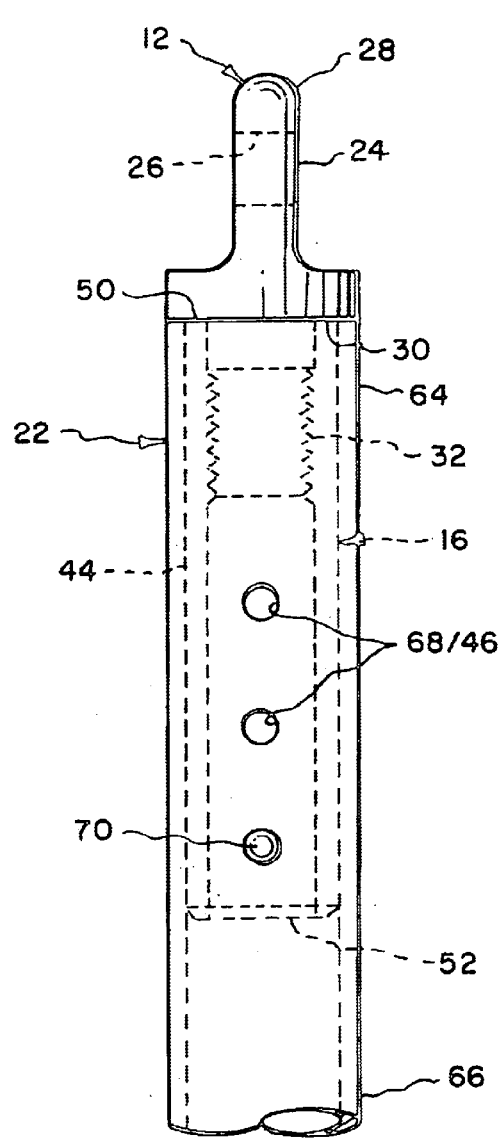
FIG. 3 is side view of an eye end of the universal connector, shown inserted into a tube end of a truss member.
Figure 4:
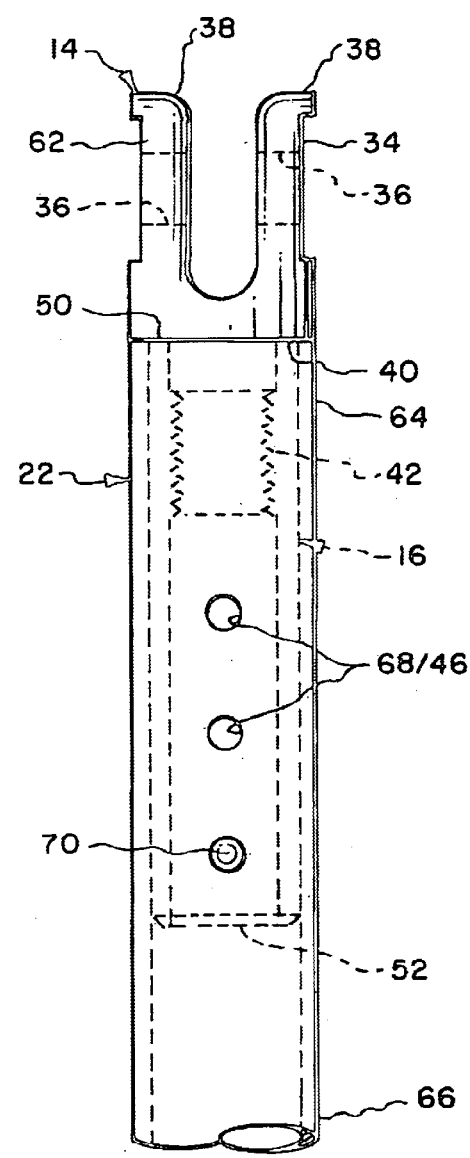
FIG. 4 is side view of a fork end of the universal connector, shown inserted into a tube end of another truss member.
Figure 5:
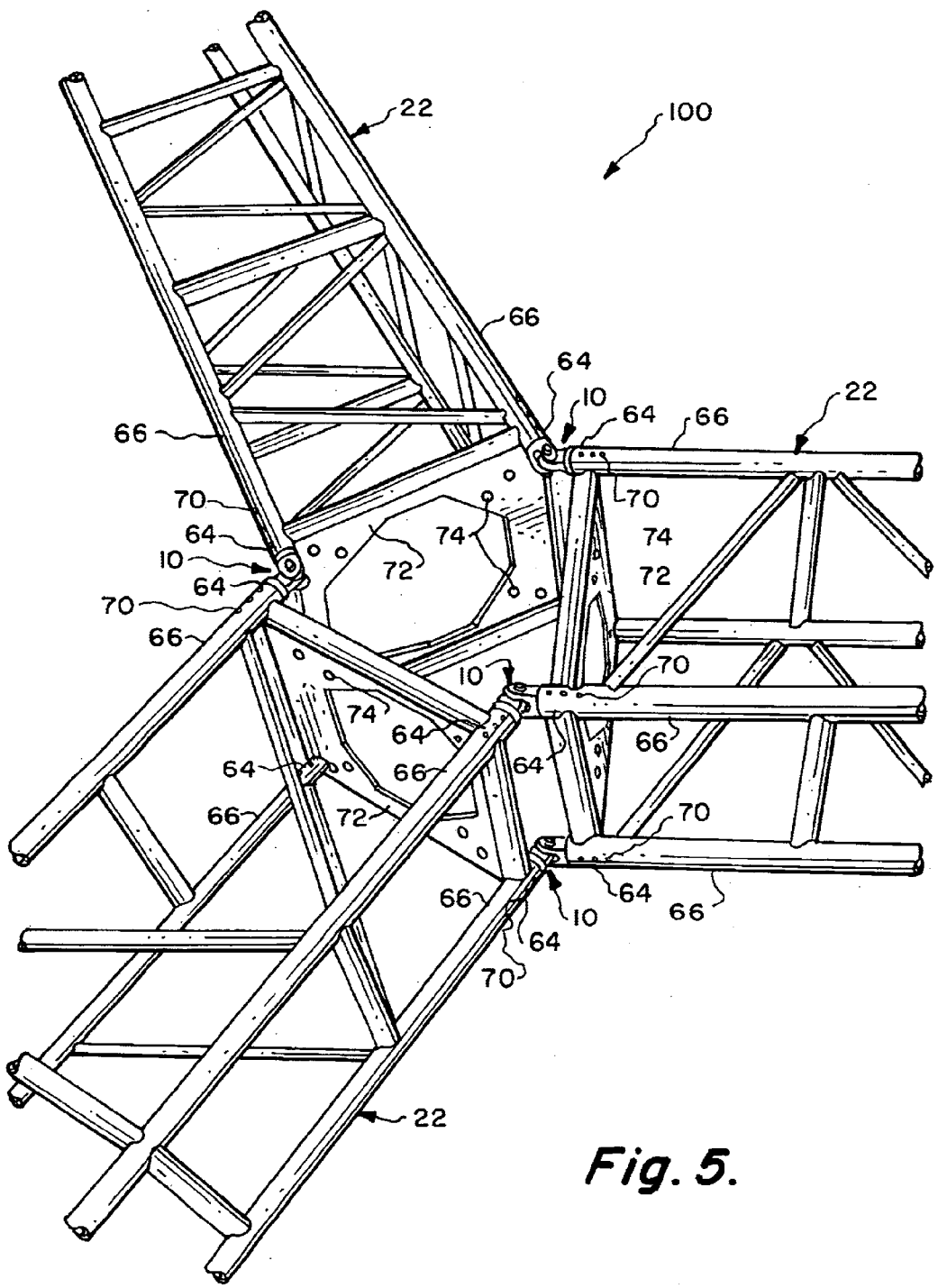
FIG. 5 is a perspective view of a truss having truss members interconnected with the universal connectors.
Figure 6:
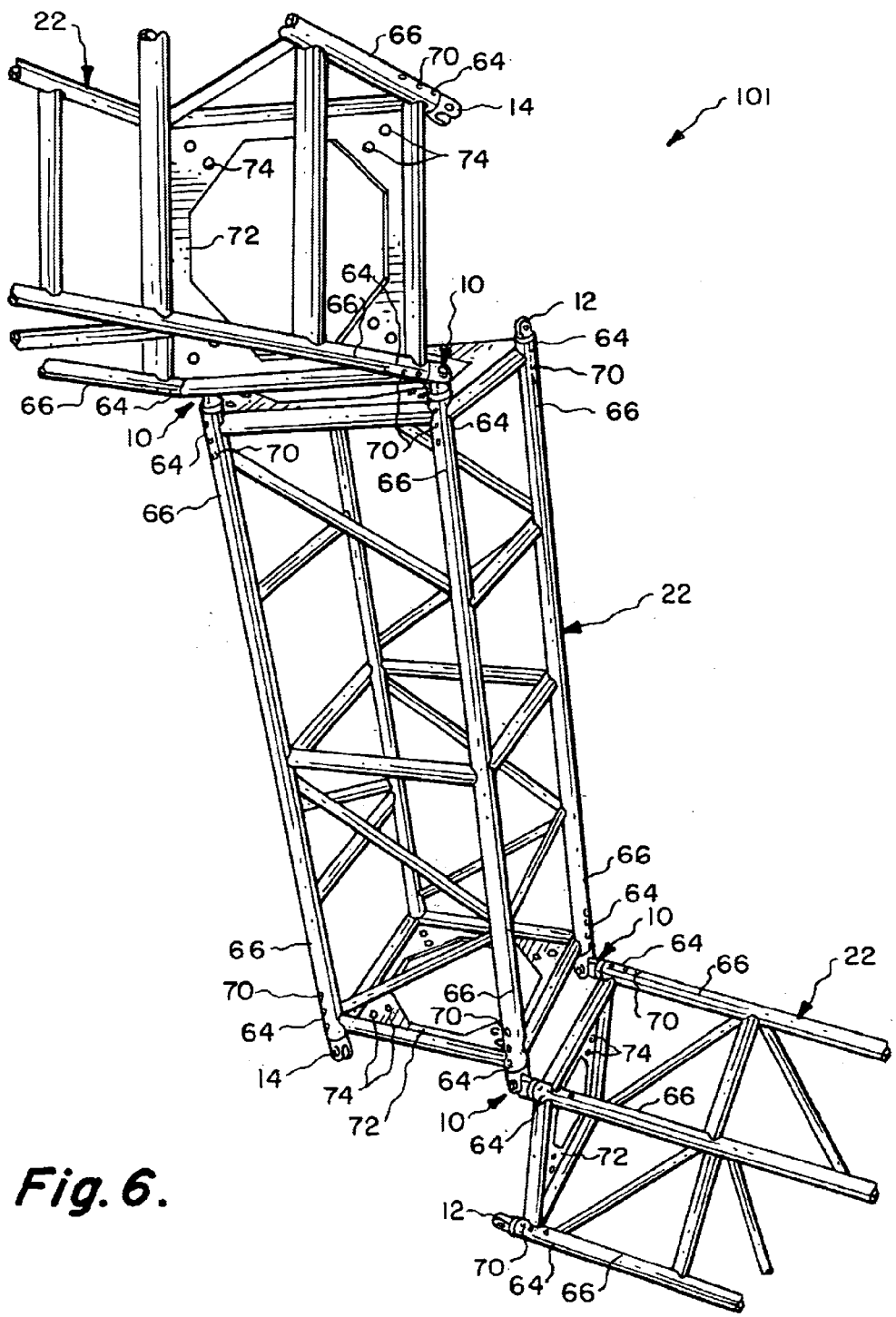
FIG. 6 is a perspective view of an alternate truss having truss members interconnected with the universal connectors.
Figure 7:
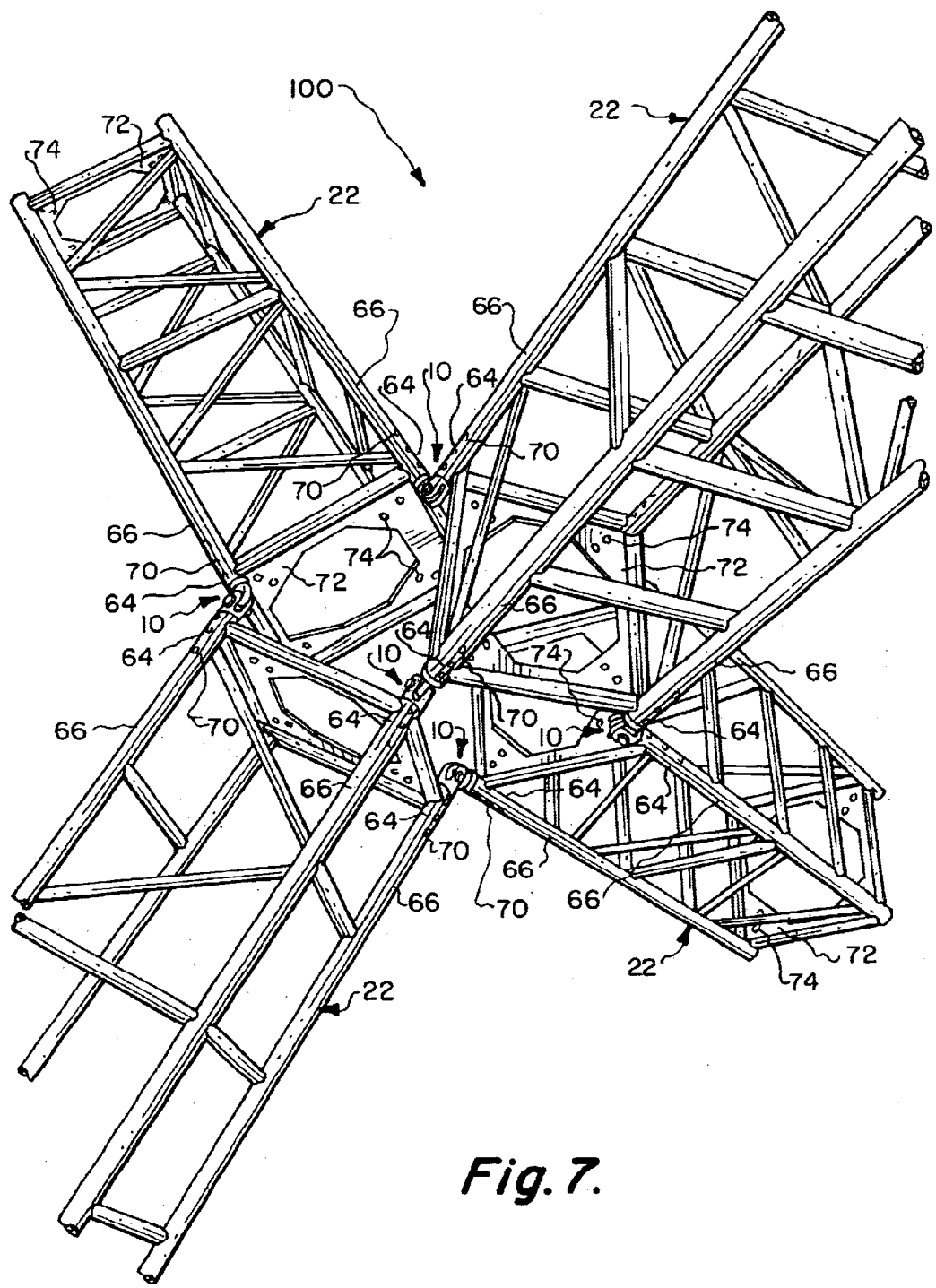
FIG. 7 is a perspective view of another alternate truss having truss members interconnected with the universal connectors.

FIGS. 1–4 show an embodiment of the present invention, a universal connector 10 having a male threaded eye end 12, a hinged mating female threaded fork end 14, opposing threaded barrel sleeves 16, a clevis pin 18, and a cotter pin 20. The universal connector 10 may be used to adjoin truss members 22 one to the other, as shown in FIGS. 5–7, which show alternate truss systems and trusses constructed with the universal connector 10.

The male threaded eye end 12 has tongue 24 having hole 26 therethrough, arcuate end 28, base stop 30, and threaded end 32. The female threaded fork end 14 has opposing forks 34 having holes 36 therethrough, arcuate ends 38, base stop 40, and threaded end 42. The threaded barrel sleeve 16 has body 44 having opposing holes 46 therethrough, interior threads 48 at base end 50 and optional tapered end 52 opposing the base end 50. The clevis pin 18 has shaft 54 having head 56 and tapered end 58 having hole 60 therethrough for receiving the cotter pin 20 therethrough.

The male threaded eye end 12 and the hinged mating female threaded fork end 14 are hingedly connected one with the other by inserting the clevis pin 18 therethrough one of the holes 36 of the opposing fork ends 14, therethrough the hole 26 of the tongue of the male threaded eye end 12, and therethrough the hole 36 of the opposing fork end 14. The arcuate end 28 of the male threaded eye end 12 and the arcuate ends 38 of the female threaded fork end 14 allow the male threaded eye end 12 and the arcuate ends 38 of the female threaded fork end 14 to be hingedly connected one with other with the greatest angular range possible.

The tapered end 58 of the clevis pin 18 allows easy insertion of the clevis pin 18, guiding the shaft 54 therethrough the holes 36 and 26 of the female threaded fork end 14 and the male threaded eye end 12. The cotter pin 20 is inserted therethrough the hole 60 of the tapered end 58 of the clevis pin 18, the head 56 of the clevis pin 18, abutting bearing surface 62 of the female threaded fork end 14, the head 56 having a larger diameter than the diameter of the holes 36 of the fork ends 14 of the female threaded fork end 14, the cotter pin 20 and the head 56 of the clevis pin 18 preventing the clevis pin 18 from being dislodged from the hingedly connected male threaded eye end 12 and the hinged mating female threaded fork end 14.

The male threaded eye end 12 and the hinged mating female threaded fork end 14 are screwed thereinto a respective one of the threaded barrel sleeves 16, fastening the male threaded eye end 12 thereto a respective one of the of the threaded barrel sleeves 16 and fastening the hinged mating female threaded fork end 14 to the other respective one of the threaded barrel sleeves 16, and abutting the base ends 50 of the respective threaded barrel sleeves 16 to the respective base stops 30 and 40 of the male threaded eye end 12 and the female threaded fork end 14, respectively.

The truss members 22 are adjoined one to the other at receiving end 64 with the universal connector 10. The threaded barrel sleeves 16 of the universal connector 10 are adapted to fit matingly thereinto the receiving ends 64 of the truss members 22, the receiving ends 64 having tubular end portions 66 having opposing holes 68 therethrough. The optional tapered end 52 of the threaded barrel sleeve 16 facilitates insertion of the body 44 of the threaded barrel sleeve 16 thereinto the tubular end portion 66 of the receiving end 64 of the truss member 22. Upon insertion of the threaded barrel sleeve 16 thereinto the receiving end 64 of a respective one of the truss members 22, the opposing holes 46 of the threaded barrel sleeve 16 and the opposing holes 68 of the tubular end portion 66 of the receiving end 64 of the truss member 22 are aligned, and fastened one to the other by inserting clevis pins 70 or other like fasteners therethrough the opposing holes 68 of the tubular end portion of the receiving end 64 of the truss member 22 and the aligned opposing holes 46 of the threaded barrel sleeve 16. The opposing threaded barrel sleeve 16 of the universal connector 10 is fastened to an adjacent one of the receiving ends 64 of an adjacent one of the truss members 22 in like fashion.

The present invention of the universal connector 10 teaches hinged connection means in conjunction with threaded connection means, which allows three degrees of freedom during assembly of the truss members 22 and facilitates construction of trusses quickly, easily, and safely. The screw threads of the threaded barrel sleeves 16, the male threaded eye end, and the 12 female threaded fork end 14 facilitate rotational alignment of the universal connector 10 with the receiving ends 64 of the truss members 22 and alignment of the opposing holes 68 of the tubular end portion 66 of the receiving end 64 of the truss members 22 with the opposing holes 46 of the threaded barrel sleeves 16. The hinged relationship of the male threaded eye end 12 of the universal connector 10 and the female threaded fork end 14 of the universal connector 10 allows the truss members 22 of a truss to be hingedly connected one with the other. The universal connector 10 allows flexibility of azimuth and elevation positioning and facilitates adjustment and alignment of the truss members 22.

The universal connector 10 may be assembled prior to fastening to the truss members 22, during construction of the truss, or in any sequence suitable during assembly and construction of the truss. The universal connector 10 is preferably of stainless steel, but may be of metal, such as steel, brass, aluminum, or other suitable material or combination thereof. The universal connector 10 may have the clevis pin 18 and the cotter pin 20 or other suitable means to hingedly fasten the male threaded eye end 12 to the hinged mating female threaded fork end 14, one with the other, may be used. The threaded barrel sleeves 16 of the universal connector 10 may have the opposing holes 46 for use with suitable fasteners, or other suitable means may be used to fasten the barrel sleeves 16 to the truss members 22.

The truss members 22 may be any standard truss members, such as, for example, lattice trusses, lattice girders, or other suitable truss members, having the opposing holes 68 drilled therethrough the tubular end portions of the receiving ends 64 of the truss members 22. The truss members 22 may optionally then be alternatively fastened one to the other, using standard techniques of fastening the truss members together at triangular plates 72 having holes 74 therethrough, by inserting bolts therethrough the holes 74 and fastening the triangular plates 72 one to the other, or the truss members 22 may alternatively be fastened one to the other with the universal connector 10 of the present invention.

The threaded barrel sleeves 16 may be left permanently within and fastened to the tubular end portions 66 of the receiving ends 64 of the truss members 22, or removed depending upon the needs and convenience of the user and as situations warrant. The male threaded eye end 12 and/or the hinged mating female threaded fork end 14 may be interchanged as needed at the appropriate receiving ends 64 of the truss members 22 to afford maximum flexibility, and as assembly and construction needs warrant.

FIGS. 5–7 show alternate embodiments of truss systems 100, 101, and 102, each having the truss members 22 connected one with the other therewith the universal connectors 10. The truss members 22 are typically of aluminum or steel, but may be of other suitable material or combination thereof. The universal connector 10 is preferably of stainless steel, but may be of steel, brass, aluminum, or other suitable material or combination thereof.

Although the present invention has been described in considerable detail with reference to certain preferred versions thereof, other versions are possible. Therefore, the spirit and scope of the appended claims should not be limited to the description of the preferred versions contained herein.

What is claimed is:

1. A universal connector comprising:

a male threaded eye end;

a female threaded fork end, said female threaded fork end hingedly fastened and mating with said male threaded eye end, one with the other; and opposing threaded barrel sleeves, one said opposing threaded barrel sleeve fastened to said male threaded eye end, said other opposing barrel sleeve fastened to said female threaded fork end, said threaded barrel sleeves adapted to be fastened thereto truss member ends.

2. The universal connector according to claim 1, wherein said threaded barrel sleeves have opposing holes therethrough, and said truss member ends have opposing holes therethrough, said opposing holes of said threaded barrel sleeves adapted to align with said opposing holes of said truss member ends.

3. The universal connector according to claim 2, wherein said threaded barrel sleeves are fastened thereto said truss member ends with fasteners inserted therethrough said opposing holes of said truss member ends and therethrough said aligned opposing holes of said threaded barrel sleeves.

4. The universal connector according to claim 1, wherein said truss member ends are tubular, said threaded barrel sleeves adapted to fit thereinto said tubular truss member ends.

5. The universal connector according to claim 4, wherein said threaded barrel sleeves have opposing holes therethrough, and said tubular truss member ends have opposing holes therethrough, said opposing holes of said threaded barrel sleeves adapted to align with said opposing holes of said tubular truss member ends.

6. The universal connector according to claim 5, wherein said threaded barrel sleeves are fastened thereto said tubular truss member ends with fasteners inserted therethrough said opposing holes of said tubular truss member ends and therethrough said aligned opposing holes of said threaded barrel sleeves.

7. The universal connector according to claim 1, wherein said female threaded fork end and said male threaded eye end are hingedly fastened one with the other therewith a clevis pin.

8. The universal connector according to claim 7, wherein said clevis pin has a cotter pin.

9. The universal connector according to claim 1, wherein said universal connector is of stainless steel.

10. A truss system comprising:

a plurality of truss members,
       each said truss member having opposing ends; and at least one universal connector fastened thereto and connecting adjacent ones of said truss members one with the other at adjacent ones of said opposing truss member ends;

each said universal connector having:

a male threaded eye end;

a female threaded fork end, said female threaded fork end hingedly fastened and mating with said male threaded eye end, one with the other; and opposing threaded barrel sleeves, one said opposing threaded barrel sleeve fastened to said male threaded eye end, said other opposing barrel sleeve fastened to said female threaded fork end, said threaded barrel sleeves adapted to be fastened thereto said adjacent ones of said opposing truss member ends.

11. The truss system according to claim 10, wherein said universal connector threaded barrel sleeves have opposing holes therethrough, and said adjacent ones of said opposing truss member ends have opposing holes therethrough, said opposing holes of said threaded barrel sleeves adapted to align with said opposing holes of said adjacent ones of said opposing truss member ends.

12. The truss system according to claim 11, wherein said universal connector threaded barrel sleeves are fastened thereto said adjacent ones of said opposing truss member ends with fasteners inserted therethrough said opposing holes of said adjacent ones of said opposing truss member ends and therethrough said aligned opposing holes of said threaded barrel sleeves.

13. The truss system according to claim 10, wherein said adjacent ones of said opposing truss member ends are tubular, said universal connector threaded barrel sleeves adapted to fit thereinto said adjacent tubular truss member ends.

14. The truss system according to claim 13, wherein said universal connector threaded barrel sleeves have opposing holes therethrough, and said adjacent tubular truss member ends have opposing holes therethrough, said opposing holes of said threaded barrel sleeves adapted to align with said opposing holes of said adjacent tubular truss member ends.

15. The truss system according to claim 14, wherein said universal connector threaded barrel sleeves are fastened thereto said adjacent tubular truss member ends with fasteners inserted therethrough said opposing holes of said adjacent tubular truss member ends and therethrough said aligned opposing holes of said threaded barrel sleeves.

16. The truss system according to claim 10, wherein said female threaded fork end and said male threaded eye end of said universal connector are hingedly fastened one with the other therewith a clevis pin.

17. The truss system according to claim 16, wherein said clevis pin has a cotter pin.

18. The truss system according to claim 10, wherein said universal connector is of stainless steel.

19. The truss system according to claim 10, wherein said truss member is of aluminum.

20. The truss system according to claim 10, wherein said truss member is of steel.

21. The truss system according to claim 10, wherein said truss system has two said adjacent ones of said truss members connected one with the other at said adjacent ones of said opposing truss member ends.

22. The truss system according to claim 10, wherein said truss system has three said adjacent ones of said truss members connected one with the other at said adjacent ones of said opposing truss member ends.

23. The truss system according to claim 10, wherein said truss system has four said adjacent ones of said truss members connected one with the other at said adjacent ones of said opposing truss member ends.

24. The truss system according to claim 10, wherein said truss system has more than four said adjacent ones of said truss members connected one with the other at said adjacent ones of said opposing truss member ends.

* * * * *